United States Patent [19]

Srinivasagopalan et al.

[11] Patent Number: 4,689,804
[45] Date of Patent: Aug. 25, 1987

[54] METHOD AND APPARATUS FOR REDUCTION OF SINUSOIDAL PHASE JITTER IN A HIGH SPEED DATA MODEM

[75] Inventors: Rangarajan Srinivasagopalan, Miami; Louis V. Farias, Sunrise, both of Fla.

[73] Assignee: Racal Data Communications Inc., Sunrise, Fla.

[21] Appl. No.: 765,419

[22] Filed: Aug. 14, 1985

[51] Int. Cl.[4] ............................................. H04L 1/00
[52] U.S. Cl. ...................................... 375/99; 375/120; 329/122
[58] Field of Search ...................... 375/57, 58, 99, 104, 375/118, 119, 13, 120; 328/168; 455/296, 305; 329/122; 307/520, 522, 360

[56] References Cited

U.S. PATENT DOCUMENTS

| | | | |
|---|---|---|---|
| 3,800,228 | 3/1974 | Acker | 375/118 |
| 4,027,250 | 5/1977 | Lang | 375/118 |
| 4,052,557 | 10/1977 | Chiu et al. | 375/99 |
| 4,106,102 | 8/1978 | Desblache | 375/103 |
| 4,143,328 | 3/1979 | Kurita et al. | 375/120 |
| 4,213,097 | 7/1980 | Chiu et al. | 330/51 |
| 4,416,017 | 11/1983 | Jasper et al. | 375/99 |
| 4,433,425 | 2/1984 | de Jaeger | 375/13 |
| 4,458,355 | 7/1984 | Motley et al. | 375/99 |
| 4,475,217 | 2/1984 | Hughes | 375/81 |
| 4,484,152 | 11/1984 | Lee et al. | 331/1 A |
| 4,504,959 | 3/1985 | Heckenbach | 375/99 |
| 4,514,855 | 4/1985 | Lang et al. | 375/118 |
| 4,530,104 | 7/1985 | Kamerman | 375/99 |
| 4,532,640 | 7/1985 | Bremer et al. | 375/120 |
| 4,606,045 | 8/1986 | Miller | 375/13 |

OTHER PUBLICATIONS

Cahn "Improving Frequency Acquisition of a Costas Loop", IEEE Transaction on Communication, vol. COM-25, No. 12, Dec. 1977, pp. 1453-1459.
"Improving Frequency Acquisition of a Costas Loop", vol. COM-25, No. 12, Dec. 1977.

Primary Examiner—Robert L. Griffin
Assistant Examiner—Stephen Chin
Attorney, Agent, or Firm—Jerry A. Miller

[57] ABSTRACT

An apparatus for cancellation of sinusoidal varying phase jitter in a data modem is implemented in firmware using microprocessor technology. An estimate of the frequency and phase of the phase jitter is computed in a first stage. Substantially independently, an estimate of the amplitude of the phase jitter is computed in another stage. These estimates are combined to form a composite estimate of the phase jitter which is utilized to cancel out the sinusoidal phase jitter in the demodulator. Digital phase locked loop technology (DPLL) is utilized to lock onto the phase jitter components. The capture range of the phase locked loop is dynamically altered during a training sequence to allow for capturing a wide range of jitter frequencies. During the training sequence the damping factor of the loop is gradually altered thereby substantially reducing the capture range and response time of the loop once jitter acquisition has occurred. This results in enhanced noise performance while still retaining the capability of locking to a wide range of jitter frequencies. Quantization of the error signal is utilized to compute estimates of the frequencies and phase of the jitter signal so that continuous updating occurs virtualy without regard for the amplitude or change in amplitude of the jitter signal.

14 Claims, 6 Drawing Figures

METHOD AND APPARATUS FOR REDUCTION OF SINUSOIDAL PHASE JITTER IN A HIGH SPEED DATA MODEM

BACKGROUND OF THE INVENTION

1. Field of the Invention

This invention relates generally to the field of phase jitter cancellation in high speed data modems and more particularly to an arrangement for reduction of phase jitter having a sinusoidal component.

2. Background of the Invention

As the speed of operation of data modems continues to increase, the problem of dealing with phase jitter in the transmitted data signal becomes increasingly bothersome. The effect of phase jitter is a rotation of the transmitted symbol without changing the magnitude of the symbol. This can cause the received symbol to differ from the transmitted symbol causing transmission errors. The receiver's immunity to jitter decreases as the number of symbols in the constellation increases. Although the symbol constellations used in such high speed modems have evolved to relatively optimal designs, phase jitter can still create errors which a high speed data modem must correct. It is therefore important to provide a mechanism for canceling as much of the phase jitter in a transmitted signal as possible.

Some types of phase jitter are non-sinusoidal and may be traceable to various randomly occurring electrical signals which may be familiar to those skilled in the art. Another type of phase jitter results when the transmitted data is corrupted by a sinusoidally varying source. This results in sinusoidal phase jitter which is the type of jitter the present invention addresses. The most frequent cause for sinusoidally varying phase jitter is related to ripple in the power supplies used by the telephone company in it's carrier communications equipment. Other sources of phase jitter also produce a slowly varying or approximately sinusoidal component of phase jitter which can be effectively canceled by utilizing the present invention. In the U.S. these sinusoidal components are generally integral multiples of 60 hertz. This is also true in Canada. In some parts of Europe, such as Great Britain, the fundamental frequency of the power line is 50 hertz and in such instances the sinusoidal component of phase jitter is frequently an integral multiple of 50 hertz. According to published data sinusoidal components may exists in transmitted data signals at frequencies between approximately 20 hertz and approximately 300 hertz.

In attempting to correct for such sinusoidally varying phase jitter, numerous problems are encountered. For example, it is possible to lock onto such sinusoidally varying components of phase jitter and produce a signal which cancels the phase jitter. But, in so doing the signal which is being locked to effectively disappears or becomes so reduced in amplitude as to become very difficult to maintain lock on. Additionally, in order to effectively compensate for such phase jitter a relatively wide range of frequencies must be locked upon. This becomes a problem in and of itself but is complicated by the fact that it is desirable to use a very narrow noise bandwidth phase locked loop so that a high degree of noise immunity is maintained. Therefore, use of a simple wideband phase-locked loop or Costas loop may accomplish significant phase jitter reduction, but at the expense of signal to noise ratio. It is also desirable in such a phase jitter canceling system to provide a mechanism for detecting when the phase jitter is small enough that the compensation is not needed. In this instance, the phase jitter correction circuitry can be disabled further enhancing the modem's noise performance.

These and other problems have been effectively addressed in the present invention and such features have been provided in order to enhance the operation of the phase jitter canceling circuitry so that data errors due to sinusoidally varying phase jitter are rare.

SUMMARY OF THE INVENTION

It is an object of the present invention to provide an improved method and apparatus for effectively canceling sinusoidal phase jitter.

It is another object of the present invention to provide phase jitter cancellation which effectively cancels sinusoidal phase jitter occurring over a wide band of frequencies without seriously degrading the noise threshold of the phase lock loop.

It is another object of the present invention to provide a phase jitter cancellation network which does not significantly degrade the noise performance of the modem's receiver.

It is another object of the present invention to provide a narrow-band phase jitter cancellation network with improved noise performance.

It is another object of the present invention to provide a phase jitter cancellation network utilizing adaptive loop parameters for enhanced acquisition and tracking of sinusoidal phase jitter with improved noise performance.

It is a further object of the present invention to provide a method and apparatus for canceling sinusoidal phase jitter in a manner which is largely independent of the amplitude of such phase jitter.

It is a further object of the present invention to provide a method for synthesizing the sinusoidal phase jitter component (used in the canceller) in a manner which is independent of the amplitude of such phase jitter.

It is a further object of the present invention to provide a method for estimating the amplitude of the jitter which is essentially independent of the method of estimating the phase and frequency of the jitter during startup and when the loop is locked.

These and other objects of the invention will become apparent to those skilled in the art upon consideration of the following description of the invention.

In one embodiment of the present invention a high speed data modem includes a circuit for compensating for sinusoidal phase jitter. The modem includes a receiver for receiver a data signal including a sinusoidal jitter $\Phi_j(t)$. A demodulator demodulates the data signal and an error calculator calculates an error signal having the form:

$$\Phi_j = \alpha_j \sin(\omega_j NT + \Psi_j).$$

A first compting circuit computes an estimate of $\omega_j$ and an estimate of $\Psi_j$ designated $\hat{\omega}_j$ and $\hat{\Psi}_j$ respectively, and produces a first output signal $\sin(\hat{\omega}_j NT + \hat{\Psi}_j)$. A second computing circuit computes an estimate of $\alpha_j$ designated $\hat{\alpha}_j$. A multiplier multiplies $\hat{\alpha}_j$ by the first output signal to produce an estimated jitter signal $\hat{\Phi}_j = \hat{\alpha}_j \sin(\hat{\omega}_j NT + \hat{\Psi}_j)$. An adding circuit produces a correction signal and the correction signal is applied to the demodulator to provide cancellations of the jitter component.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
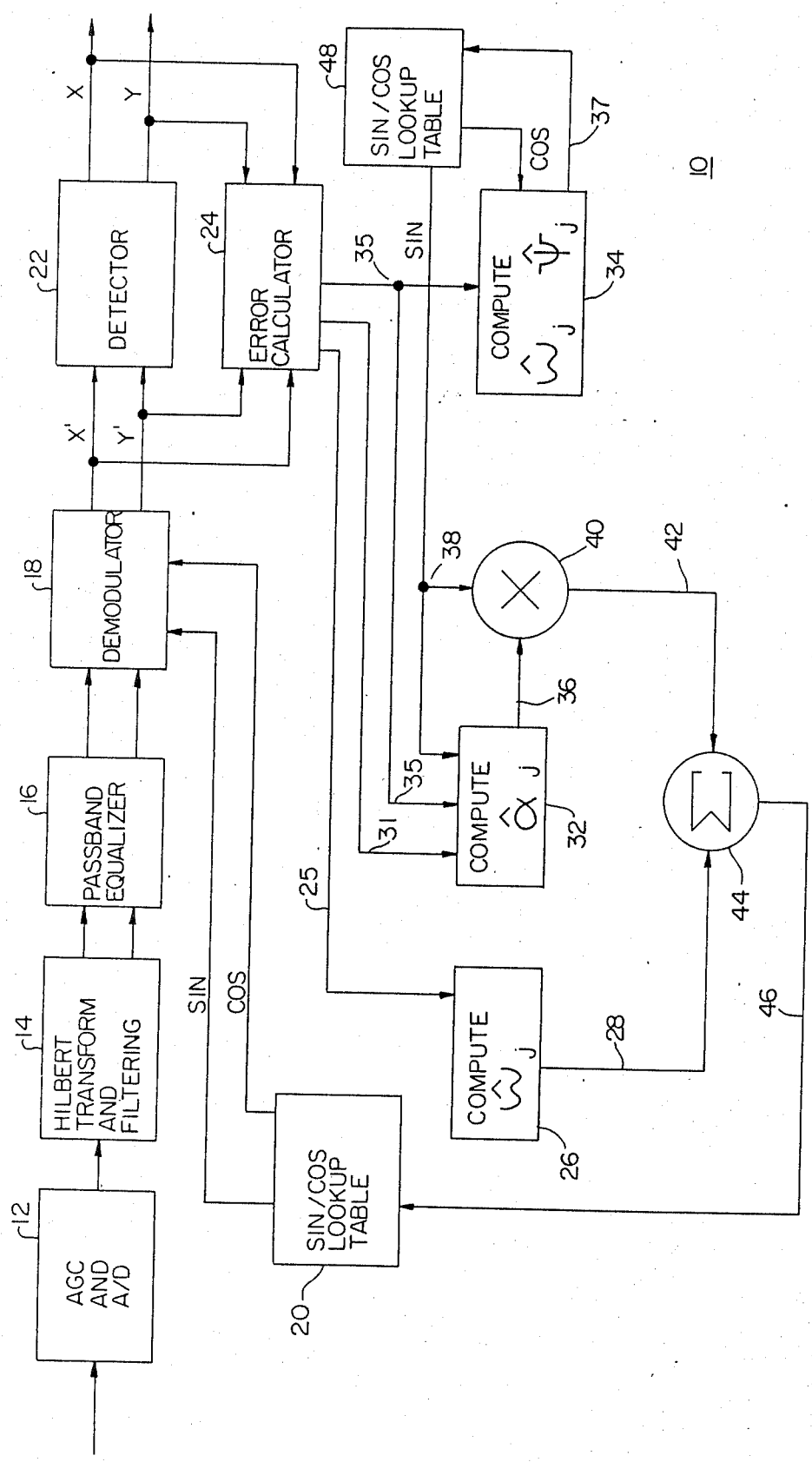
FIG. 1 is an overall block diagram of the modem phase jitter cancellation network according the present invention.

Before describing the inventive portion of the circuitry, the conventional operation of the modem receiver 10 of FIG. 1 will be briefly described. A receiver line signal $$R(t) = \sum_m a_m g(t - mT)\cos(\omega_c t + \Phi_j(t)) - b_m g(t - mT)\sin(\omega_c t + \Phi_j(t)) + n_G(t)$$

containing the phase jitter component $\Phi_j(t)$ is received from the remote modem transmitter (not shown) preferably at a rate of 14.4 KBPS. In this relation, $n_G(t)$ represents Gaussian noise. The line signal is received by an automatic gain control circuitry (AGC) and A/D convertor 12, such as shown in U.S. Pat. No. 4,231,097 which is incorporated by reference as though disclosed fully herein. The regulated digitized received signal is then passed to the Hilbert transform and bandpass filters 14 which produces an output comprising a filtered complex signal having in phase and quadrature phase signal components. The filtered complex signal is received by a passband equalizer 16, which corrects for intersymbol interference.

The equalized complex signal is fed to a demodulator 18 which multiplies the equalized passband signal by the term $\epsilon^{-j\hat{\theta}_c}$ with $\hat{\theta}_c$ reflecting the recovered carrier angle and compensates to some degree for frequency offset and phase jitter. The sine and the cosine signals necessary for demodulating the complex passband signals can be derived from a sine/cosine look-up table 20. The equalized and demodulated signal represents a 2-dimensional, complex valued symbol, with the in-phase signal component being designated as X' and the quadrature signal component being designated as Y'. These two demodulated signals, X' and Y' are supplied to a decision or detection (slicer) circuit 22. The received complex signal X'+jY' defines the received symbol which the detector uses to determine the most probable transmitted symbol defined as X+jY. It is this symbol which comprises the received data. At an error calculating means 24, the inputs and outputs to the detector 22 are subtracted to create the error signals $e_X=(X-X')$ and $e_Y=(Y-Y')$.

Error signals $e_x$ and $e_y$ are normally employed to continuously adapt equalizer 16 by circuitry so as to remove some of the effects of linear distortion due to the transmission medium between the transmitter and receiver. The decision signals X, Y are then passed to the user through other apparatus, e.g. descramblers, parallel to serial convertors, demultipliers, etc., which are not necessary to the discussion of the invention.

Not shown in the diagram are such normal facets of such a digital receiver, normally forming part of a modem for the recovery of data timing scrambling etc., which again do not form part of this invention. Also, the present description assumes that digital data and timing clock pulses are available so that digital data can be clocked through our apparatus as it is through the normal apparatus of the receiver.

Error calculator 24 produces an error signal $\theta_e$ at node 25 which generally has the form of Equation 1 where n(NT) is a noise component of phase jitter which is not sinusoidal. This error signal $\theta_e$ (or a signal proportional to $\theta_e$) is applied to a computing block 26 which computes the value of an estimate of the radial carrier frequency $\omega_c$ designated $\hat{\omega}_c$ and produces an output at its output terminal 28 of the form $\hat{\omega}_c NT$. The error signal $\theta_e$ is also supplied to a quantizer within error calculaor 24 (see FIG. 5) which is basically a limiter with a dead zone surrounding the origin. This quantizer serves to produce a constant output signal level at node 35 regardless of the level of the input error signal. Of course if the signal level falls within the bounds of the dead zone, as when only noise is present of when jitter is very small, no quantization will occur and it will appear that the error is completely corrected (i.e. no error correction required). Otherwise, a constant input signal level is provided to computing blocks 32 and 34 at node 35. Computing block 32 produces an output at its output terminal 36 which is an estimate of $\alpha_j$ (the magnitude component of the sinusoidal phase jitter) which is designated $\hat{\alpha}_j$. (For purposes of this document characters with a hat, such as $\hat{\alpha}_j$ are used to represent estimates.)

$$\theta_e(NT) = \Phi_j(NT) + \Delta\omega_c NT + n(NT) \qquad \text{Equation 1}$$

where $T=1$ baud interval;
$\Delta\omega_c$ is the change in carrier frequency;
N is the Nth time instant;
$\Phi_j(NT) = \alpha_j \sin(\omega_j NT + \Psi_j)$;
n(NT) = Noise.

Similarly, computing block 34 produces an address signal at node 37 which addresses sine/cosine lock-up table 48 to obtain a signal at its output 38 which includes estimates of $\omega_j$ and $\Psi_j$ which are designated $\hat{\omega}_j$ and $\hat{\Psi}_j$ respectively. The signal output appearing at node 36 is an estimate of the magnitude of the phase jitter $\alpha_j(NT)$. The signal at the output node 38 takes the form of $\sin(\hat{\omega}_j NT + \hat{\Psi}_j)$. These signals at nodes 36 and 38 are multiplied together by a multiplier 40 to produce a signal which is an estimate of the error signal $\Phi_j$ and is designated $\hat{\Phi}_j$. The error signal estimate therefore takes the form of equation 2 which appears at the output 42 of multiplier 40.

$$\hat{\Phi}_j(NT) = \hat{\alpha}_j(NT) \sin(\hat{\omega}_j NT + \hat{\Psi}_j). \qquad \text{Equation 2}$$

The outputs of computing block 28 and multiplier 40 are added together in an adding network 44. The output of adding network 44 appears at node 46 as the demodulating carrier angle and has the form of equation 3. The demodulating carrier angle $\hat{\theta}_c(t)$ at $t=NT$ has two components. The first component $\hat{\omega}_c NT$ is an estimate of the phase of carrier frequency and the second term is the estimate of the phase jitter which will be used to cancel the sinusoidal phase jitter.

$$\hat{\theta}_c(NT) = \hat{\omega}_c NT + \hat{\alpha}_j(NT)\sin(\hat{\omega}_j NT + \hat{\psi}_j) \quad \text{EQUATION 3:}$$
$$= \hat{\omega}_c NT + \hat{\phi}_j(NT).$$

This estimate $\hat{\theta}(NT)$ is applied to sine/cosine look-up table 20 which provides outputs which are the sine and cosine of $\hat{\theta}(NT)$ and are used in demodulating the received waveform. In fact, the sine, cosine look-up table 20 may be thought of us a portion of demodulator 18. A second sine cosine look-up table 48 is shown coupled to computing blocks 32 and 34 for convenience of illustration. It will be recognized by those skilled in the art, however, that sine/cosine look-up table 48 may actually be the same table as sine/cosine look-up table 20. One skilled in the art will also recognize that the preferred implementation of the present invention utilizes microcomputer technology so that all of the functional blocks of the present compensation network may be largely implemented by use of digital computer specially programmed for such functions. However, the present invention should not be limited to such embodiments as it is also possible to provide direct hardware implementation of the present invention utilizing integrated circuit technology and the like. Preferably the present invention is implemented largely by utilizing a high speed 16 bit microcomputer with associated ROM firmware and RAM storage. The look-up tables are implemented in ROM and the entire signal processing arrangement is firmware controlled with the phase-locked loops being digital PLL's implemented in firmware.

The overall system includes three loops; one loop for estimating carrier frequency, a second loop for estimating the jitter amplitude and a third loop for estimating frequency and phase of the phase jitter. The main loop serves as a carrier frequency $\omega_c$ tracking loop and traces a path 18-22-24-26-40-44-20. A second loop serves to lock onto and track the jitter amplitude $\omega_j$ and traces a path 18-22-24-32-40-44-20. A third loop (the jitter loop) traces the path 18-22-24-34-48-40-42-44-20 and serves to lock onto and track and jitter frequency $\omega_j$ and jitter phase $\Psi_j$. Of course all three loops operate in a manner wherein each loop is somewhat dependent on the other two loops for complete system operation. However, the main loop functions essentially independent of the other two loops with its effects added in at adder 44. Each of the loops are computationally independent except in that output of 48 serves as an input to 32 and all of the jitter computations interact at multiplier 40 to form a composite signal to be used in correcting for the phase jitter.

In the preferred embodiment, the main loop is a very narrow noise bandwidth loop (during steady state) which is locked onto the carrier frequency. It is capable of tracking and providing a small degree of correction for jitter below about 20 hertz. The capture range of the jitter loop starts out at approximately 300 hertz during receipt of a training sequence. During the course of the training sequence, the capture range of the loop is gradually reduced to about 20 hertz so that during steady state conditions, the noise bandwidth is very narrow. This enhances the noise performance of the modem, while allowing for acquisition of sinusoidal jitter from about 10 hertz to about 300 hertz. It has been determined that sinusoidal phase jitter does not normally change very rapidly in a given situation although it may vary from channel to channel, or site to site, etc. For this reason, it is possible to narrow the loop as described and still maintain good tracking of the jitter. In the event a rapid change in jitter does occur, an increase in errors may result which will cause another training sequence to be sent per the normal operation of such high speed modems. In this event, the jitter loop is widened in capture range in order to once again acquire lock with the new jitter signal as described previously. The details of this acquisition enhancement process will be described later.

Figure 2:
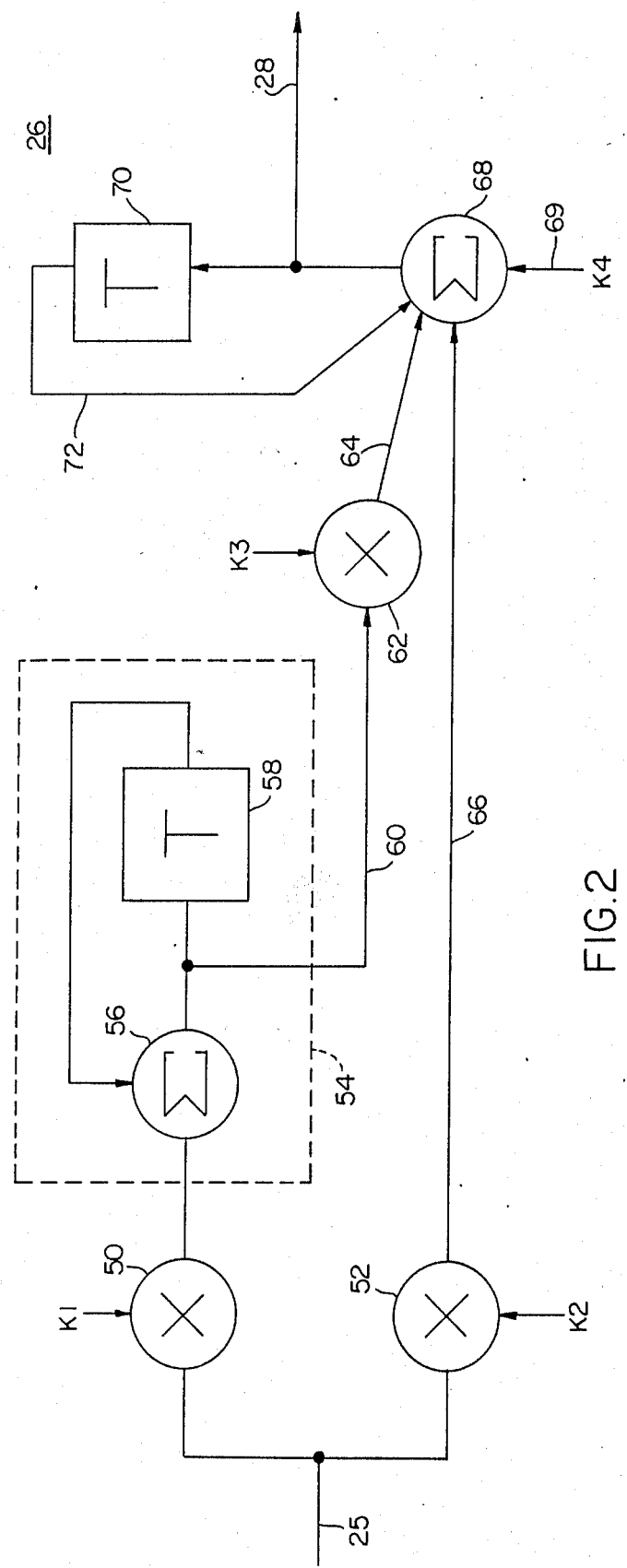
FIG. 2 is a more detailed diagram of the circuitry for tracking frequency translation by computing $\omega_c$.

Turning now to FIG. 2, a more detailed diagram of computing block 26 is shown. The error signal $\theta_e(NT)$ from node 25 of error calculator 24 is applied to multipliers 50 and 52 which multiply this signal by constants $K_1$ and $K_2$ respectively. More detail will be provided later about the constants used in this computing block as well as computing blocks 32 and 34. The product of $\theta_e(NT)$ and $K_1$ at the output of block 50 is provided to an integrator 54 shown in broken lines. Integrator 54 includes a summing device 56 which adds the incoming signals from multiplier 50 to the time delayed output of delay 58 which provides a one baud delay to signals provided at its input. The output of integrator 54 is taken at the junction of summing device 56 and delay 58 at node 60 which also forms the input of a multiplier 62. Multiplier 62 multiplies the signal at node 60 by a constant $K_3$ to produce an output at node 64. The output of multiplier 52 is provided to a node 66 which forms an input to a summing device 68. Node 64 also forms an input to summing devices 68 as does input 69 which supplies a constant $K_4$ to summing device 68. Summing device 68 also operates as an integrator in conjunction with delay 70 which is also one baud in duration. The output of summing device 68 is provided to delay 70 which in turn feeds back its output to another input 72 of summing device 68. The junction of summing device 68 and delay 70 forms the output 28 of computing block 26. Computing block 26 serves to create the carrier frequency estimate $\hat{\omega}_c$.

The operation of computing block 26 may be best understood by considering the following explanation. The error signal $\theta_e(NT)$ has two components; one is the error due to the difference between the transmitter carrier phase and the receiver's estimated carrier phase. The second component is the residual phase jitter. FIG. 2 represents a digital phase locked loop (DPLL) which computes an estimate $\hat{\theta}_c(NT)$ of the carrier phase angle. The product of $\theta_e(NT)$ and $K_1$ at the output of multiplier 50 is provided to an integrator 54.

The integrator 54 represented by the summer 68 and the delay unit 70 forms a portion of the voltage controlled oscillator (VCO) of the DPLL. The output of the VCO is converted to $\sin(\theta_c)$ and $\cos(\theta_c)$ using look-up tables. The constant $K_4$ is proportional to the carrier frequency of the modem. In the 14.4 KBPS high-speed modem of the preferred embodiment the carrier frequency is 1700 hertz. The variables in FIG. 2 can be represented by two coupled first order difference equations shown in Equations 4 and 5.

$$FRC(NT) = FRC((N-1)T) + K_1 K_{d1} \theta_e((N-1)T) \quad \text{Equation 4}$$

$$\hat{\theta}_c(NT) = \hat{\theta}_c[(N-1)T] + [K_3 FRC(NT)] + K_{d1} K_2 \theta_e[(N-1)T]K_{VCO1} \quad \text{Equation 5}$$

Where $K_{d1}$ is the phase detector gain $\theta_e$ is the total phase error, $\theta_c$ is the estimate of carrier phase and $K_{VCO1}$ is the gain of the VCO. Although $\theta_e$ has carrier phase error and phase jitter the loop represented by FIG. 2 only corrects for carrier phase error and does not correct the phase jitter.

Figure 3:
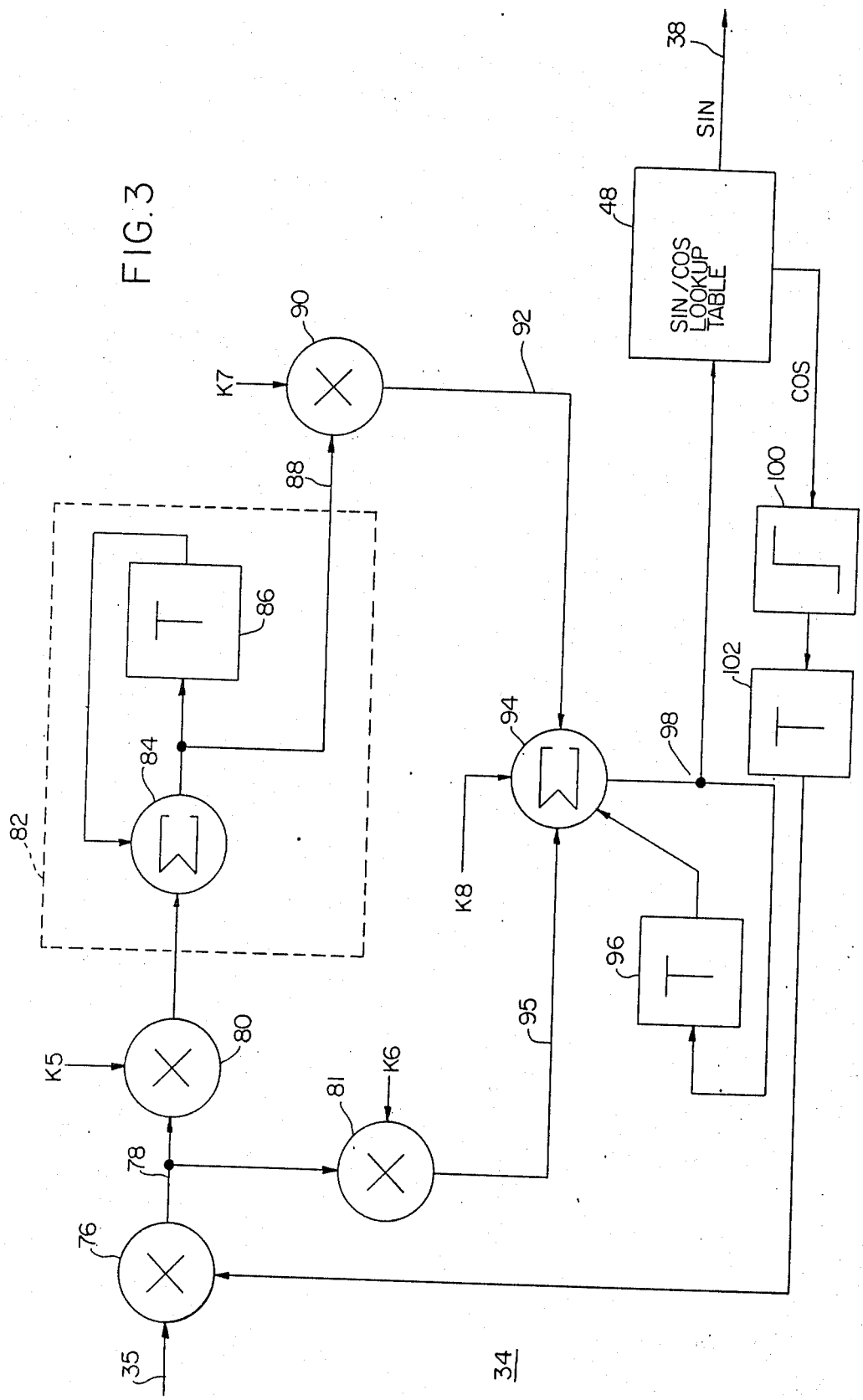
FIG. 3 shows a more detailed diagram of the circuitry used for tracking phase jitter components by computing $\hat{\omega}_j$ and $\hat{\Psi}_j$.

Turning now to FIG. 3 computing block 34 is described in more detail. Computing block 34 serves primarily to compute and track the frequency and phase of the phase jitter component. Node 35 which is the output of the previously mentioned quantizer also forms the input to block 34 and is coupled to a multipler 76 whose output 78 is coupled to a second multiplier 80 and also to a third multiplier 81. Multipliers 80 and 81 multiply the signal at node 78 by constants $K_5$ and $K_6$ respectively. The output of node 80 is coupled to an input of an integrator 82 which is formed by a summing device 84 together with a delay 86 coupled together in a similar manner to integrator 54. The output of integrator 82 is taken at node 88 which also forms the input of a multiplier 90. Multiplier 90 multiplies the signal at node 88 by a constant $K_7$ to form its output at node 92. The output at node 92 is provided to a summing device 94.

Summing device 94 also works in conjunction with delay 96 to produce an integrating operation. In doing so, summing device 94 output at node 98 is provided as an input to delay 96. A scaling constant $K_8$ may be added in at summing device 94 in order to provide adjustment of the natural frequency of the system. In the preferred embodiment, this scaling constant is set to 0. The output of delay 96 is in turn fed back to summing device 94. The output signal at node 98 enters sine/cosine look-up table 48 to produce the sine of the input at output node 36 and the cosine output which are supplied to a limiter 100. The output of limiter 100 is delayed by delay 102 before being provided as the second input to multiplier 76.

The circuit embodiment of FIG. 3 is described by the operation of a second order DPLL. The first integrator 82 corresponds to the integrator of the loop filter. The second integrator 95 corresponds to the VCO. The multiplier 76 is the phase detector (PD). The one baud delay introduced by delay element 102 is to match the one baud delay in the loop from 46 to 24 in FIG. 1. The two coupled first order equations which describe the operation of FIG. 3 are:

$$FRG(N) = FRJ(N-1) + K_5 K_{d2}\text{sign}[\theta_e]\text{sign}(\cos[\hat{\phi}_j(N-1)]) \quad \text{Equation 6}$$

$$\hat{\phi}_j(N) = \hat{\phi}_j(N-1) + K_{VCO2} K K_{d2}\text{sign}[\theta_e]\text{sign}[\cos[\hat{\phi}_j(N-1)]] + K_{VCO2} K_7 FRJ(N) \quad \text{Equation 7}$$

Where:
FRJ = jitter frequency, and
$K_{VCO2}$ = the gain of this VCO

Figure 4:
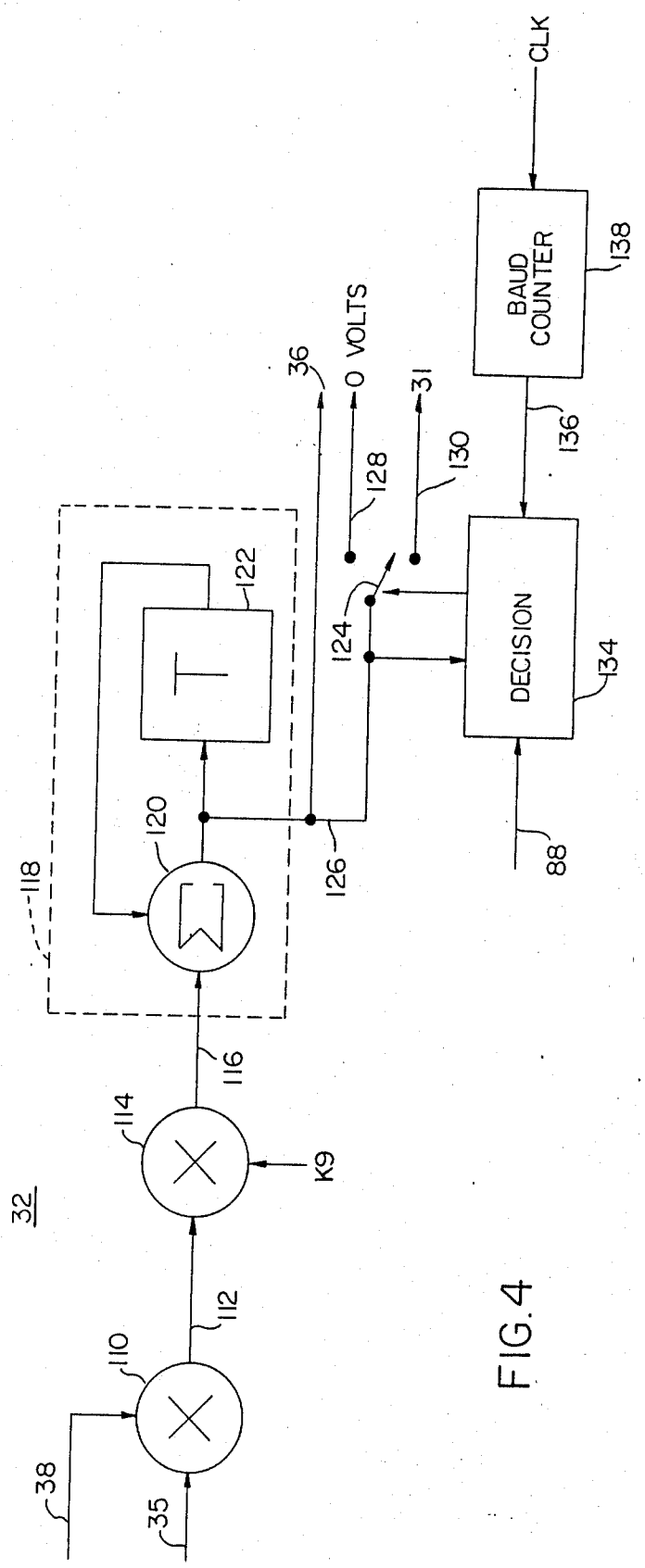
FIG. 4 shows a more detailed diagram of the circuitry used to compute the estimate $\hat{\alpha}_j$ of the magnitude $\alpha_j$ of the phase jitter.

Turning now to FIG. 4, the phase jitter magnitude tracking computing block 32 is described in more detail. The sine output of sine/cosine look-up table 48 at node 38 is provided as a first input at node 38, and the quantized error signal at node 35 is provided as a second input to a multiplier 110 to produce an output at its output node 112. This output at node 112 is multiplied by a constant $K_9$ at multiplier 114. The output 116 of multiplier 114 is connected to the other input of an integrator 118 made up of adder 120 and delay unit 122. The output 126 of integrator 118 is connected to a switch 124 and to node 36 under steady state conditions.

Normally under steady state conditions, switch 124 is controlled by a decision block 134 coupled to a baud counter 138 that connects the output 36 to node 31 after a fixed number of bauds from the beginning of the training sequence. The switching of 124 to position 218 (0 volts) is controlled by decision block 134 which checks the frequency of the jitter being tracked and the magnitude of the jitter being tracked. If any one of the parameters falls below a predetermined threshold the jitter correction circuit will be disabled and the switch 124 will be connected to position 128 as follows:

Baud counter 138 is, of course, responsive to the system clock. Decision block 134 is also coupled to computing block 26 at node 88 to receive jitter frequency information. If the jitter frequency is less than an appropriate threshold (about 10 HZ in the preferred embodiment) the switch 124 is set to 0 volts by decision block 134. Similarly, if decision block 134 determines from node 130 that the jitter magnitude is less than an appropriate threshold (about 2 to 2½ degrees in the preferred embodiment) switch 124 is set to 0 volts by decision 134. In this manner, the correction circuit can be disabled in the presence of low jitter. This decision making operation is made under the control of baud counter 138 as follows.

If the value of the frequency estimate and amplitude estimate are below the threshold values at about 25 seconds after steady state (as determined by baud counter 138) then the integrator output 126 in FIG. 4 is grounded by switch 124 thereby setting the output of the estimator to zero. If on the other hand the frequency estimate is above the threshold but the amplitude estimate is within the the dead zone of the limiter then the limiter output will be zero thus disabling the loop. If there is indication of jitter present at the sampling instant (i.e. at 25 seconds) but later if the jitter falls into the dead zone of the limiter then the zero output of the limiter will effectively disable the loop.

Figure 5:
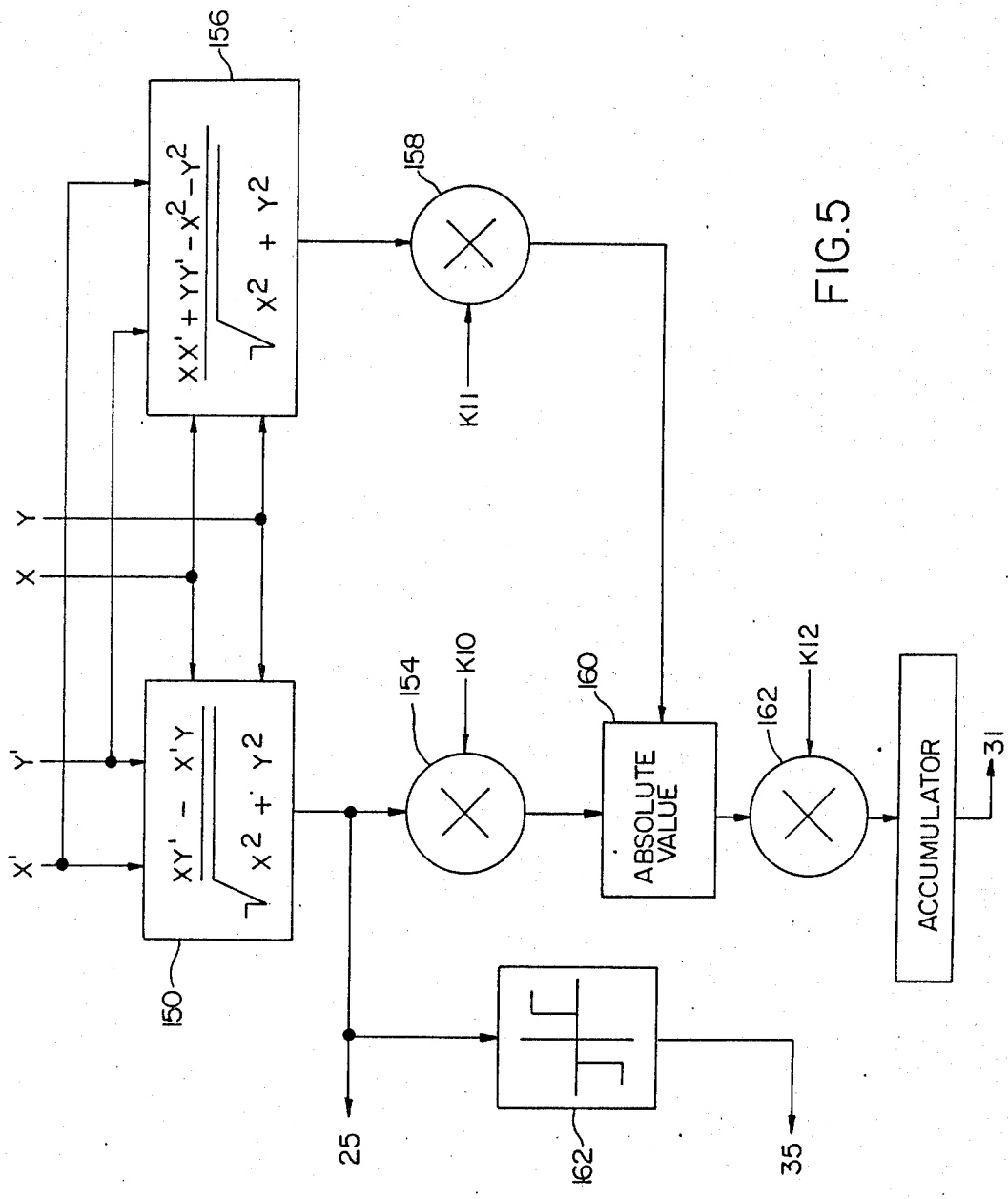
FIG. 5 shows a detailed diagram of the error calculator.

Turning now to FIG. 5, a more detailed block diagram of error calculator 24 is shown. As previously discussed, error calculator 24 accepts inputs X, Y, X' and Y' from both sides of detector 22. A phase error estimate is computed in block 150 preferably using the equation shown in the block to produce a signal at node 25 which is equivalent $\theta_e(NT)$. This signal at node 25 is further processed by a quantizer 152 which operates as previously described in that it is a quantizer having a dead zone which serves to ignore signals below a predetermined threshold while limiting signals above the noise threshold and producing an output at node 35. The signal at node 35 is therefore quantized (limited) and virtually independent of amplitude of the error signal at node 25. The signal at node 25 is also processed independently by a multiplier 154 which provides a gain factor of $K_{10}$ to the signal at node 25. Signals X, Y, X' and Y' are also processed by an amplitude error estimator 156 which operates according to the calculations shown in box 156 to produce an estimate of the amplitude error which is scaled by a multiplier 158 operating in conjunction with constant $K_{11}$. The outputs of multiplier 154 and 158 are processed by an absolute value circuit 160 to produce a signal of the form of equation 8.

output of $160 = |[\theta_e(NT)] - [(K_{11})(\text{amplitude error})]|$.  Equation 8

This signal is multiplied by $K_{12}$ at multiplier 162 and then fed to an accumulator 164 to produce the signal at node 31.

Computing block 32 is used to compute the estimate of $\alpha_j$. In theory, block 32 computes an integral approximating the integral of the product of the error signal and the estimated error signal as shown in equation 9.

$$\hat{\alpha}_j = \int [\alpha_j \sin(\omega_j t + \Psi_j) + n(t)][\sin(\hat{\omega}_j Nt + \hat{\Psi}_j)] dt. \quad \text{Equation 9}$$

Exact computation of equation 9, however, produces a signal which ultimately diminshes to a point wherein an update cannot be made at every baud because of pulsation of the jitter. This problem is alleviated by utilizing the quantized signal at node 35. By quantizing the signal computing blocks 32 and 34 are provided with a constant signal level regardless of the level of the error signal $\theta_j$ and depends only on the sign of $\alpha_j$.

Computing block 32 computes the estimate of $\alpha_j$ by taking the discrete time integral of the product of the sign of the error signal and the sign of the estimated error signal as shown in equation 10.

$$\hat{\alpha}_j(NT) = \hat{\alpha}_j(NT-T) + \text{sign}[\Phi_j(NT)]\sin(\hat{\omega}_j NT + \hat{\Psi}_j) \quad \text{Equation 10}$$

During steady state computing, block 32 uses the quantized signal at node 31 (i.e. only uses the sign of $\alpha_j$). Computing block 34 also uses the quantized signal at 31 thus making the estimation of phase and frequency independent of the level of the error signal $\theta_e$.

It should also be noted that computing block 32 is extremely easy to implement resulting in substantial hardware savings due to the small numbers of calculations. Equations 4 and 5 describe the time domain behavior of the coupled first order difference equations. These equations can to a first order be approximated by linear equations 11 and 12.

$$FRJ(N) = FRJ(N-1) + K_5 K_{ph}(\Phi_j(N-1) - \hat{\Phi}_j(N-1)) \quad \text{Equation 11}$$

$$\hat{\Phi}_j(N) = \hat{\Phi}_j(N-1) + K_{VCO} K_6 K_{ph}(\hat{\Phi}_j(N-1) - \Phi_j(N-1)) + K_{VCO2} K_7 FRJ(N) \quad \text{Equation 12}$$

In arriving at these equations we assume that the carrier phase error is zero. Here $K_{ph}$ is the gain of the equivalent linear phase detector. The phase detector gain $K_{ph}$ can be calculated by the formula of equation 13.

$K_{ph}$ = (Fundamental Frequency Output)/(Input Phase Angle to Phase Detector)  Equation 13

From the constants $K_5$, $K_{ph}$, $K_{VCO}$, $K_6$ and $K_7$ it is possible to calculate the constants $\zeta$ (loop damping factor) and the natural frequency $\omega_n$ of the corresponding continuous time loop using well known techniques such as those described in Lindsay and Chie A. Survey of Digital Phase-locked Loops PROC of IEEE Vo. 69 no. 4, April 1981, pp. 4410–431. If T is the sampling period then $$\alpha = \epsilon^{-\zeta \omega_n T} \cos(\omega_n T \sqrt{1-\zeta^2}) \quad \text{EQUATION 14:}$$

$$\beta = \epsilon^{-\zeta \omega_n T} \sin(\omega_n T \sqrt{1-\zeta^2}) \quad \text{EQUATION 15:}$$

where $\alpha$ and $\beta$ are poles on the unit circle in the sampled data system and $\epsilon$ is the base of natural logarithms.

$$\alpha = \frac{1}{2}(2 - K_{VCO} K_6 K_{ph} - K_{VCO} K_7 K_5 K_{ph})$$

$$\alpha^2 + \beta^2 = 1 - K_{VCO} K_6 K_{PH}$$

where we have assumed $\zeta < 1$ (See Lindsay and Chie). A similar set of relations can be obtained for $\zeta > 1$. (It must be pointed out that for linerization to hold it is assumed that the loop is locked and that the error is small). It can be shown from these relations that the larger the value of the phase detector gain ph' the wider the capture range is for the PLL.

However, in Equations 11 and 12, the relation $K_{ph}(\hat{\Phi}_j(N-1) - \Phi_j(N-1))$ takes on the discrete values (e.g., +1, −1, 0), then depending on the values of $K_{VCO}$, $K_6 K_{ph}$ there is a lower bound on the phase angle advanced per baud. This phase angle advanced per baud decreases as the input frequency decreases. Hence, keeping a large value of $K_{ph}$ limits the lower frequency which can be captured by the DPLL. Thus we have a tradeoff. On approach is to use a Costas loop with automatic frequency argumentation as proposed in C. R. Cahn "Improving Frequency Acquisition of a Costas Loop" IEE Transactions on Communications December 1977 pp. 1453–1459. This however will degrade the noise threshold.

It is a feature of the present invention to start with a wide capture range to capture the frequency and phase of the signal and then to gradually reduce the noise bandwidth of the PLL. Accordingly the training period is divided into several time segments (6 in the preferred embodiment) each of which utilizes a particular capture range, natural frequency and damping factor.

Figure 6:
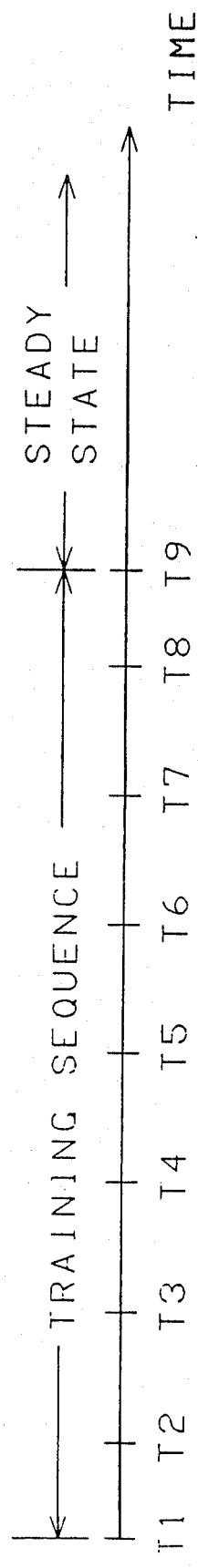
FIG. 6 shows a diagram illustrating the process of dynamically altering the loop constraints of the present invention.

This feature is best understood by noting FIG. 6 in conjunction with Table 1. During the initial time segment from the start up of the training sequence to time T3 no action is taken allowing timing, carrier and equalizer to converge.

During the next six segments the phase lock loop (PLL) captures the jitter and the amplitude estimating loop is trained. During the six segments the value of $\omega_n$ (natural frequency of the loop) is decreased and $\zeta$ (loop damping factor) is increased thereby decreasing the noise bandwidth (capture range) of the loop and at the same time making the loop slower to react to fast changes. This prevents the loop from losing lock in the process of switching the constants. A typical set of $\zeta$ and $\omega_n$ are shown in Table 1. Data can be accepted after the seventh argument since by that time both the amplitude loop and the PLL would have been completely trained.

The sets of values of $\omega_n$ and $\beta$ have been selected to approximately optimize operation of the system for typical operation in the present sinusoidal phase jitter. It will be clear to those skilled in the art however that further improvement may be possible by further optimizing the values of table one which are not intended to be limiting.

TABLE 1

|  | T1 | T2 | T3 | T4 | T5 | T6 | T7 | T8 | T9 |
|---|---|---|---|---|---|---|---|---|---|
| $\zeta$ | 0 | 0 | 0.707 | 0.944 | 1.26 | 1.67 | 2.25 | 3 | 1.123 |
| $\omega_n$ | 0 | 0 | 430 | 250 | 100 | 50 | 25 | 2.5 | 8.885 |

In accordance with the preferred operation of the invention, at time T1 of FIG. 6 the training sequence for the equalizer of the receiving modem is transmitted by the transmitting modem. The inverval T3-T4 is chosen long enough to capture frequencies from 10 HZ to 300 HZ. In the preferred embodiment all the intervals except the last T8-T9 are made the same and are set equal to 384 bauds and the last interval is set equal to one half of the other intervals. This combination has been chosen mainly for ease of implementation. It can be seen from Table 1 that the product $\zeta\omega_n$, which is proportional to the capture range, is decreased with increasing time. In the steady state condition the value of $\zeta$ is chosen so that the frequency update of the loop is maintained. The training sequence ends at time T8, after which reception of data begins.

At time T9 the final set of constants are implemented to produce the narrowest capture range of the loop. These set of constants are utilized during steady state reception of data from the transmitting modem. By gradually reducing the bandwidth of the tracking loops of the present invention, significant improvement or noise performance as been attained with the present invention.

The values shown in table one have been selected to approximately optimize operation of the system for typical operation in the presence of sinusoidal phase jitter. It will be clear to those skilled in the art, however, that further improvement may be possible by further optimizing the values shown in table one and the values of table are not intended to be limiting. The selection of values of the constants discussed earlier may be selected by those skilled in the art by known techniques using the values of Table 1.

By using the present invention to cancel sinusoidal phase jitter, the frequency and phase estimates of jitter may be made essentially independent of the amplitude of the jitter. Those skilled in the art will recognize the advantages of such computational independence in light of the previous discussion such as the ability to capture a wide range of amplitudes with ease. In addition, since the amplitude of the jitter is estimated in the first stage by taking the absolute values of the difference between the absolute magnitude of the jitter error and the scaled estimate of the noise amplitude, the system is less prone to error resulting from noise (i.e. the system's noise performance is enhanced).

The present system exhibits the further advantage of updating the jitter estimate at every baud during steady state conditions. This is accomplished by one bit quantization and allows continuous jitter update almost without regard for jitter amplitude. This results from discrete integration of the quantity obtained by multiplying the sign of the (jitter) error by $\sin(\hat{\omega}_j NT + \hat{\Psi}_j)$. This also prevents pulsations of jitter at the receiver.

Of course those skilled in the art will know that even the best of jitter cancellers will result in some degree of degradation in noise performance of a modem. The present invention, however, contends with this by allowing the cancellation to be disabled under circumstances wherein the error rate will not benefit from its operation. Of course, the present invention minimizes such degradations by the scheme disclosed herein of dynamically altering the characteristics of the loop.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A high speed data modem having means for compensating for sinusoidal phase jitter, said modem comprising in combination:

means for receiving a data signal which is corrupted by a time varying sinusoidal jitter comoponent $\Phi_j(t)$;

means for demodulating said data signal;

means for estimating a sampled time varying error signal having the form $$\theta_e(NT) = a_j\sin(\omega_j NT + \Psi_j) + \Delta\omega_c NT + n(NT),$$

where $a_j$ is a magnitude component of said phase jitter, $\omega_j$ is a frequency component of said phase jitter, N is an integer, T is a baud period, $\Psi_j$ is a phase component of said phase jitter, $\Delta\omega_c$ is a change in carrier frequency and n(NT) is noise;

first computing means for computing from said error signal an estimate of $\omega_j$ and an estimate of $\Psi_j$ designated $\hat{\omega}_j$ and $\hat{\Psi}_j$ respectively, and for producing a first output signal $\sin(\hat{\omega}_j NT + \hat{\Psi}_j)$;

second computing means for computing from said error signal an estimate of $a_j$ designated $\hat{a}_j$ essentially independent of said first computing means;

a multiplier for multiplying $\hat{a}_j$ by said first output signal to produce a N estimated jitter signal $\hat{\Phi}_j(NT) = \hat{a}_j\sin(\hat{\omega}_j NT + \hat{\Psi}_j)$; and means coupled to said demodulating means, for applying said error signal to said demodulating means to probide cancellation of said jitter component.

2. The modem of claim 1, wherein said second computing means includes integrating means for computing an approximation of: $\int \Phi_j \sin(\hat{\omega}_j t + \hat{\Psi}_j)dt$ to produce a result which is proportional to $\hat{a}_j$.

3. The modem of claim 1, further comprising:

means for inactivating said compensating means in the even said phase jitter component is acceptably small.

4. The modem of claim 3, wherein said inactivation means inactivates said compensating means in the even the amplitude of said jitter is less than approximately 2.5 degrees or in the event the frequency of said jitter is less than approximately 10 Hz.

5. The modem of claim 1, wherein said first computing means includes:

a multiplyer for multiplying said error signal by a predetermined number;

means for receiving a training sequence; and means for altering the value of said nubmer at a predetermined time following the beginning of receipt of said training sequence.

6. The modem of claim 1, further including:

quantizing means for adjusting the amplitude of said error signal $\theta_e(NT)$ to one of two predetermined levels prior to processing of said error signal by said second computing means.

7. The modem of claim 1, further including:

quantizing means for adjusting the amplitude of said error signl $\theta_e(NT)$ to one of two predetermined levels prior to processing of said error signal by said third computing means.

8. The modem of claim 1, further including means for dynamically adapting a characteristic of said first computing means to permit acquisition of a relatively wide band of jitter signals initially and to permit improved noise performance after acquisition of said jitter signal.

9. A method for canceling sinusoidal phase jitter in a data modem, comprising the steps of:
   computing an error signal indicative of the difference between a received signal and an ideal signal;
   quantizing said error signal to reduce amplitude variations in said error signal and to produce a quantized error signal;
   computing estimates of a frequency and a phase component $\hat{\omega}_j$ and $\hat{\Psi}_j$ respectively of the jitter from said quantized error signal and providing a signal $\sin(\hat{\omega}_j NT + \hat{\Psi}_j)$, where N is an integer and T is a sampling interval;
   computing an estimate of an amplitude component $\hat{a}_j$ of said of said jitter from said error signal;
   multiplying said amplitude estimate by $\sin(\hat{\omega}_j NT + \hat{\Psi}_j)$ to produce a jitter estimate $\hat{\Phi}_j(NT)$;
   producing a correction from said jitter estimate; and
   controlling a demodulator with said correction signal to largely cancel out said sinusoidal phase jitter.

10. In a data modem, a circuit arrangement for adaptively compensating for sinusoidal phase jitter, comprising:
   means for receiving a signal including an information portion corrupted by a sinusoidal jitter component;
   means for receiving a training sequence lasting a predetermined time interval;
   locking means for locking to said sinusoidal phase jitter component and for producing a jitter signal estimate, said locking means having a bandwidth characteristic;
   adaptive means for changing said bandwidth characteristic during said predetermined time interval; and
   canceling means, responsive to said locking means, for substantially canceling said sinusoidal phase jitter component, said canceling means including a phase-locked loop for tracking said information portion of said signal and modulating means for modulating said phase-locked loop with said jitter signal estimate in order to effefct cancellation of said sinusoidal phase jitter component.

11. The circuit arrangement of claim 10, wherein said adaptive means reduces said bandwidth characteristic during said predetermined time interval.

12. The circuit arrangement of claim 11, wherein said adaptive means progressively reduces said bandwidth characteristic during the course of said predetermined time interval.

13. The circuit arrangement of claim 12, wherein said bandwidth characteristic includes a capture range and wherein said adaptive means progressively reduces said capture range from a relatively wide bandwidth to a relatively narrow bandwidth.

14. The circuit arrangement of claim 10, wherein said bandwidth characteristic includes a capture range.

* * * * *